US011879272B2

(12) United States Patent
Shiu et al.

(10) Patent No.: US 11,879,272 B2
(45) Date of Patent: Jan. 23, 2024

(54) LOCK MECHANISM AND HOLDING STRUCTURE FOR ELECTRONIC DEVICE

(71) Applicant: Wistron Corporation, New Taipei (TW)

(72) Inventors: Meng-Chian Shiu, New Taipei (TW); Chi-Jen Lo, New Taipei (TW)

(73) Assignee: Wistron Corporation, New Taipei (TW)

( * ) Notice: Subject to any disclaimer, the term of this patent is extended or adjusted under 35 U.S.C. 154(b) by 944 days.

(21) Appl. No.: 16/432,951

(22) Filed: Jun. 6, 2019

(65) Prior Publication Data

US 2020/0291689 A1 Sep. 17, 2020

(30) Foreign Application Priority Data

Mar. 12, 2019 (TW) ................................ 108108325

(51) Int. Cl.
*E05B 65/00* (2006.01)
*E05B 15/04* (2006.01)
(Continued)

(52) U.S. Cl.
CPC ...... *E05B 65/0067* (2013.01); *E05B 15/0053* (2013.01); *E05B 73/0082* (2013.01); (Continued)

(58) Field of Classification Search
CPC ...... Y10T 70/40; Y10T 70/409; Y10T 70/411; Y10T 70/5004; Y10T 70/5009; Y10T 70/7096; Y10T 70/983; Y10T 70/7989; Y10T 70/7994; Y10T 70/8649; Y10T 292/1016; Y10T 292/0977; Y10T 292/102; Y10T 292/221; Y10T 292/34; Y10T 292/394; Y10T 292/0997; Y10T 292/1022; Y10T 292/397; Y10T 292/1099;
(Continued)

(56) References Cited

U.S. PATENT DOCUMENTS 119,198 A * 9/1871 Thompson .............. E05C 3/042 292/251
1,602,264 A * 10/1926 Hutchison ................. E05C 1/04 292/60
(Continued)

FOREIGN PATENT DOCUMENTS

TW 201716284 5/2017

OTHER PUBLICATIONS

"Office Action of Taiwan Counterpart Application", dated Feb. 27, 2020, p. 1-p. 9.

*Primary Examiner* — Christine M Mills
*Assistant Examiner* — Faria F Ahmad
(74) *Attorney, Agent, or Firm* — JCIPRNET

(57) ABSTRACT

A lock mechanism including a main body, a base, a rotating component and a position limiting component is provided. The base is slidably connected to the main body, and the main body is sleeved on the base. The rotating component is pivoted to the main body, and the rotating component is configured to drive the base to slide relative to the main body. The position limiting component is coupled to the rotating component so as to lock the rotating component with one of the main body and the base. A holding structure of an electronic device is also provided.

18 Claims, 10 Drawing Sheets

(51) Int. Cl.
*E05B 15/00* (2006.01)
*E05B 1/00* (2006.01)
*E05B 73/00* (2006.01)

(52) U.S. Cl.
CPC ................. *E05B 2001/0076* (2013.01); *E05B 2015/0413* (2013.01); *E05Y 2900/606* (2013.01)

(58) Field of Classification Search
CPC ... Y10T 292/10; E05B 73/00; E05B 73/0005; E05B 73/0082; E05B 35/008; E05B 65/0067; E05B 15/0053; E05B 2015/0413; E05B 2001/0076; B65D 45/16; B65D 45/20; B65D 45/24; E05Y 2900/606
See application file for complete search history.

(56) References Cited

U.S. PATENT DOCUMENTS 1,675,033 A * 6/1928 Lefkovitz ................. E05C 1/04 292/60
1,876,237 A * 9/1932 Jackson ................ F16B 5/0266 292/256.73
2,422,693 A * 6/1947 McArthur ............... F16B 21/09 410/116
2,863,689 A * 12/1958 Grant .................. E05B 17/0025 74/89.32
2,950,141 A * 8/1960 Koff .................... F16B 13/0808 292/256.73
3,020,017 A * 2/1962 Watson .................. A61G 13/12 248/205.8
3,297,348 A * 1/1967 Griffiths .................. E05C 19/14 292/288
3,774,946 A * 11/1973 Hammann ............ E05B 65/006 292/256.73
5,032,045 A * 7/1991 Calco ........................ E05C 1/04 292/61
6,234,435 B1 * 5/2001 Yeh ...................... F16M 13/022 248/205.8
6,749,160 B1 * 6/2004 Richter ................ F16M 11/041 248/500
7,007,908 B2 * 3/2006 Tsay ....................... G11B 33/00 248/205.5
7,215,767 B2 * 5/2007 Wang ...................... H04M 1/04 455/345
7,303,171 B1 * 12/2007 Chen ....................... B60R 11/02 396/419
7,431,250 B2 * 10/2008 Chen ....................... F16B 47/00 248/205.5
7,516,926 B2 * 4/2009 Liu ....................... F16B 47/006 248/205.5
7,658,354 B2 * 2/2010 Wang ...................... F16B 47/00 248/205.5
7,661,638 B2 * 2/2010 Yu ........................... F16B 47/00 248/205.8
7,815,155 B2 * 10/2010 Hung ...................... F16B 47/00 248/205.5
8,250,811 B2 * 8/2012 Zijlstra ..................... E05C 1/10 292/64
8,398,127 B2 * 3/2013 Persiani ................. B60K 15/05 292/137
9,732,785 B2 * 8/2017 Kobayashi .............. F16B 47/00
10,190,345 B2 * 1/2019 McCullough ......... E05C 19/188
10,934,749 B2 * 3/2021 Braz ......................... E05C 1/04
2005/0157869 A1 7/2005 Wang
2007/0262217 A1 * 11/2007 Wang ...................... F16B 47/00 248/205.5

* cited by examiner

100B

LOCK MECHANISM AND HOLDING STRUCTURE FOR ELECTRONIC DEVICE

CROSS-REFERENCE TO RELATED APPLICATION

This application claims the priority benefit of Taiwan patent application serial no. 108108325, filed on Mar. 12, 2019. The entirety of the above-mentioned patent application is hereby incorporated by reference herein and made a part of this specification.

BACKGROUND

Technical Field

The disclosure relates to a lock mechanism and a holding structure, in particular, to a lock mechanism and a holding structure for an electronic device.

Description of Related Art

In recent years, in stores, hospitals, stations, banks, transportation vehicles or other public places, display devices are usually provided to provide audio and video information to the public. The display devices can be equipped with a virtual operation interface (such as a touch panel) or a physical operation interface (such as a keyboard or mouse) to facilitate the operation of the users, so as to obtain the information needed. Generally, the display device is mostly fastened to the machine, the wall, the frame or other carriers. Therefore, in the process of dismounting the display device, the operator has to remove the screw by hand tools or automatic tools in order to remove the display device from the machine, the wall, the frame or other carriers. On the other hand, the operator has to fasten the display device to the machine, wall, frame or other carriers by using hand tools or an automatic tool to fasten the locking screws. The above process of dismounting the display device is time consuming and inconvenient.

SUMMARY

The disclosure provides a lock mechanism which is extremely convenient in operation.

The disclosure provides a holding structure for an electronic device, which is extremely convenient in operation and has a good reliability.

A lock mechanism in one embodiment of the disclosure includes a main body, a base, a rotating component and a position limiting component. The base is slidably connected to the main body, and the main body is sleeved on the base. The rotating component is pivoted to the main body, and the rotating component is configured to drive the base to slide relative to the main body. The position limiting component is coupled to the rotating component so as to lock the rotating component with one of the main body and the base.

A holding structure for an electronic device in one embodiment of the disclosure includes a carrier, an electronic device, and a plurality of lock mechanisms. The carrier has a first surface, a second surface opposite to the first surface, and an opening penetrating the first surface and the second surface. The electronic device includes a body and a case connecting to the body. The case abuts against the first surface of the carrier, and the body passes through the opening of the carrier. The body has a mounting part extending beyond the second surface of the carrier. The lock mechanisms are disposed at the periphery of the mounting part of the body. Each of the lock mechanisms includes a main body, a base, a rotating component and a position limiting component. The main body is detachably fastened with the mounting part of the body. The base is slidably connected to the main body, and the main body is sleeved on the base. The rotating component is pivoted to the main body. The rotating component drives the base to slide relative to the main body in a direction toward the second surface of the carrier and to abut against the second surface of the carrier, or drives the base to slide relative to the main body in a direction away from the second surface of the carrier to make the base and the second surface of the carrier separate from each other. The position limiting component is coupled to the rotating component so as to lock the rotating component with one of the main body and the base.

Based on the above, the lock mechanism of one embodiment of the disclosure is extremely convenient in operation. By driving the rotating component to rotate relative to the main body, the base is able to be directly or indirectly driven by the rotating component to slide relative to the main body. Since the holding structure for the electronic device adopts the lock mechanism in one embodiment of the disclosure, the steps to mount or remove the electronic device are extremely fast and easy for the operator. On the other hand, after the electronic device is locked on the carrier by the lock mechanisms, the rotating component is prevented from being arbitrarily rotated because of the engagement of the rotating component and the position limiting component. Accordingly, the electronic device is firmly mounted on the carrier. In other words, the holding structure for the electronic device in one embodiment of the disclosure has a good reliability.

In order to make the aforementioned and other features and advantages of the disclosure more comprehensible, embodiments accompanying figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
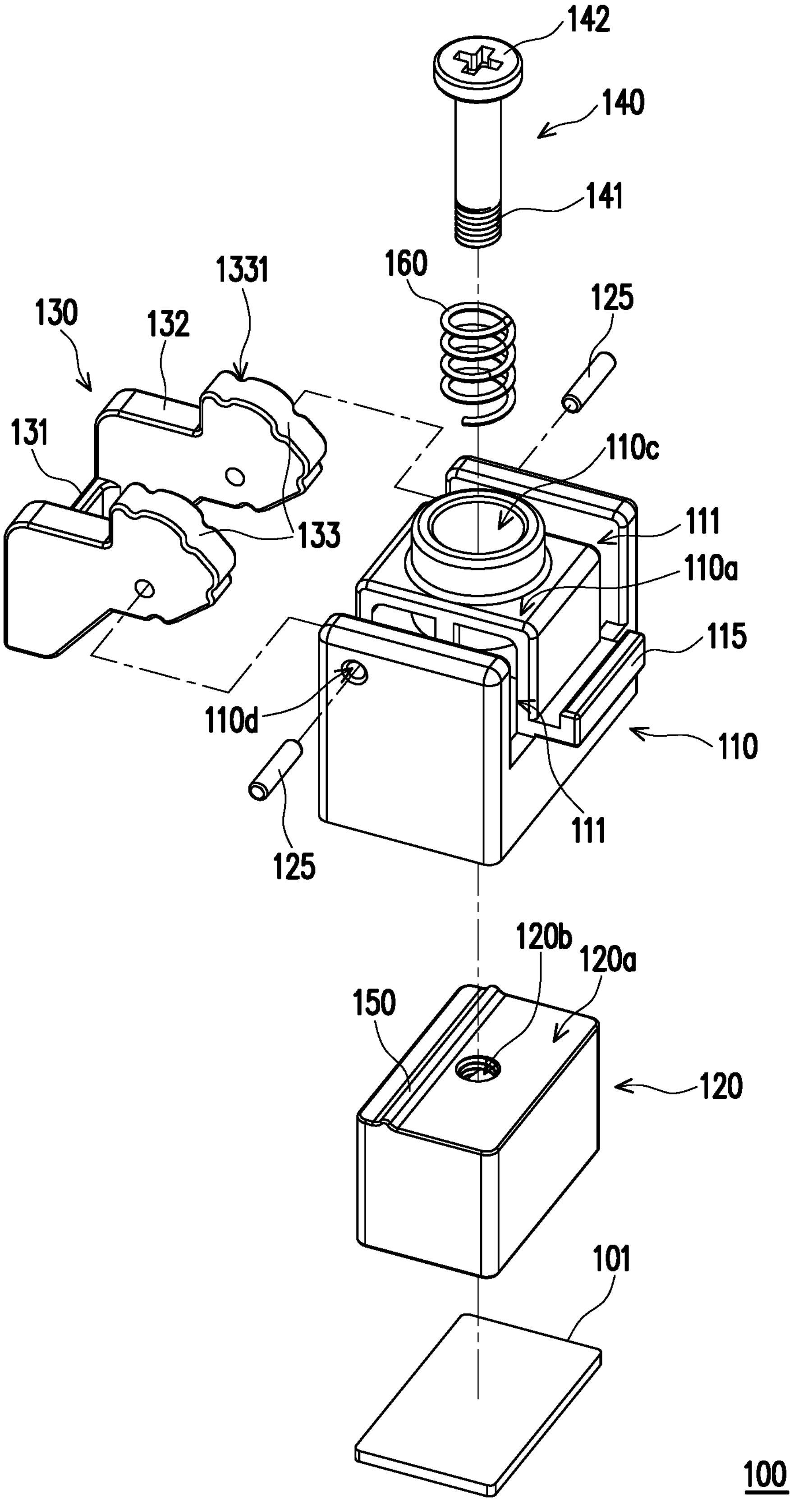
FIG. 1 is an exploded view of a lock mechanism according to one embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Figure 2:
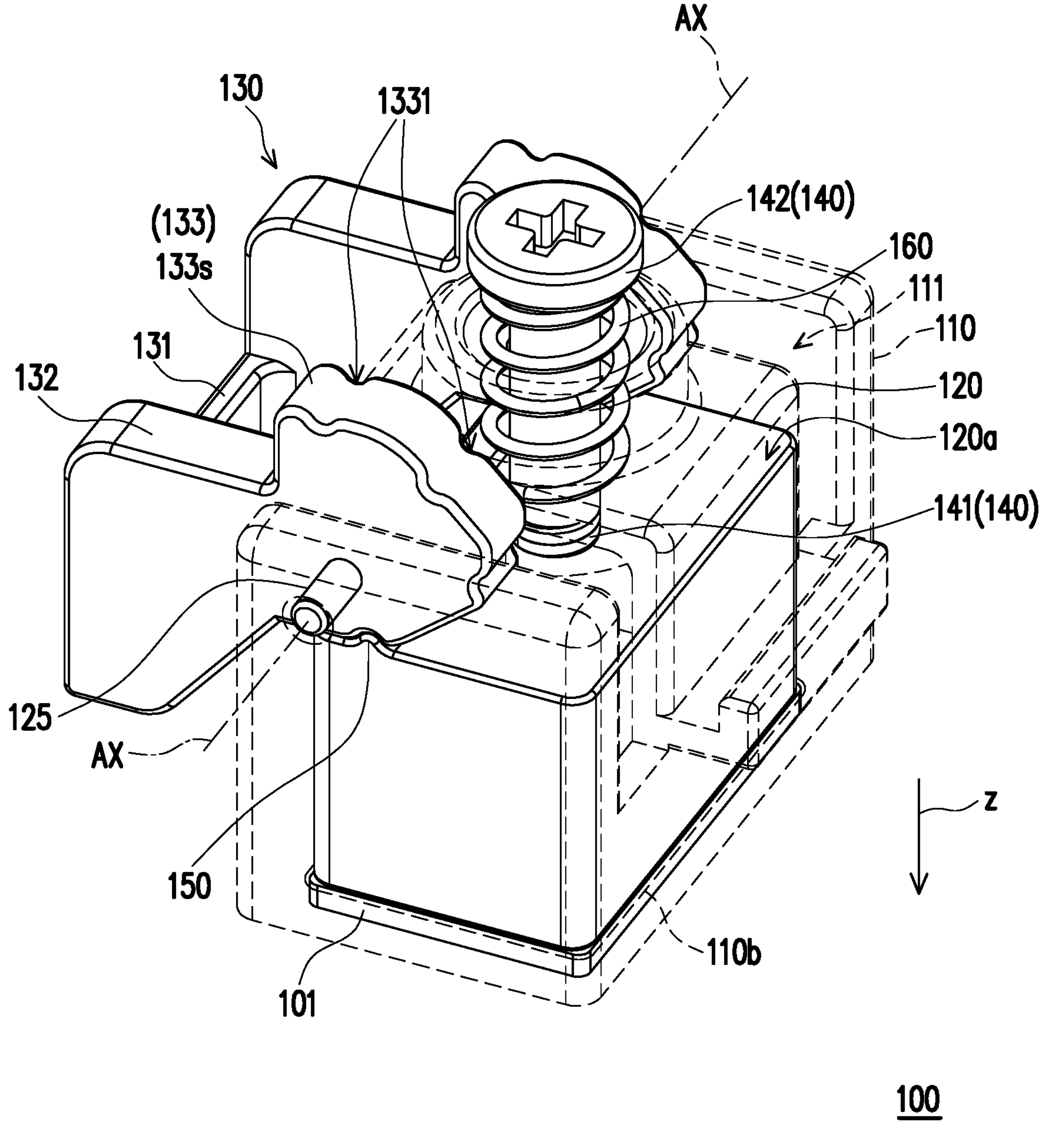
FIG. 2 is a schematic view of a lock mechanism according to one embodiment of the disclosure.

Referring to FIG. 1 and FIG. 2, in the present embodiment, a lock mechanism 100 mainly includes a main body 110, a base 120, a rotating component 130, and a position limiting element 150. The main body 110 is a hollow housing and is sleeved on the base 120. The base 120 is slidably connected to the main body 110. The main body 110 has a top surface 110*a* and an opening 110*b* opposite to each other, and the base 120 may be completely accommodated inside the main body 110, or at least one portion of the base 120 may exceed beyond the opening 110*b* and is exposed from the main body 110. In the process of the base 120 sliding with respect to the main body 110, the base 120 may slide through the opening 110*b* in a direction away from the top surface 110*a* and then to be exposed from the main body 110 or to increase the proportion of the base 120 exposed from the main body 110. Otherwise, the base 120 may slide through the opening 110*b* in a direction toward the top surface 110*a* and then to be completely moved into and accommodated inside the main body 110 or to decrease the proportion of the base 120 exposed from the main body 110.

Furthermore, in order to ensure the sliding connection between the base 120 and the main body 110 and to prevent the base 120 from departing from the main body 110 via the opening 110*b*, the lock mechanism 100 is configured with a position limiting member 140 passing through the top surface 110*a* of the main body 110 and fastened to the base 120. Still further, the top surface 110*a* of the main body 110 is configured with a through-hole 110*c*, the position limiting member 140 is inserted into the main body 110 via the through-hole 110*c* and is fastened to the base 120 located inside the main body 110. For example, the position limiting member 140 may be a positioning screw having the first end 141 and the second end 142 opposite to each other. The first end 141 has an external thread, and a bearing surface 120*a* facing the through-hole 110*c* of the base 120 is configured with a locking hole 120*b*. The external thread of the first end 141 of the position limiting member 140 is used to engage with an internal thread of the locking hole 120*b* of the base 120, so as to fasten the position limiting member 140 with the base 120. On the other hand, the outer diameter of the second end 142 of the position limiting member 140 is greater than the outer diameter of the first end 141 of the position limiting member 140, and the through-hole 110*c* is configured with a position limiting structure therein. In the process of the position limiting member 140 being slid along with the base 120 with respect to the main body 110, if the base 120 slides in the direction away from the top surface 110*a*, once the second end 142 of the position limiting member 140 interferes with the position limiting structure inside the through-hole 110*c*, the base 120 stops sliding in the direction away from the top surface 110*a*, so as to prevent the base 120 from departing from the main body 110. In other words, the position limiting member 140 can be used to ensure the siding connection between the base 120 and the main body 110 and to ensure the base 120 being slid relative to the main body 110 within a specific stroke.

In the present embodiment, the rotating component 130 is pivoted to the main body 110 and is configured to abut against the base 120. Furthermore, the rotating component 130 includes at least one cam 133 (schematically depicted as two) configured to abut against the bearing surface 120*a*. Since the main body 110 covers the base 120, the top surface 110*a* of the main body 110 is configured with at least one slot 111 (schematically depicted as two) so as to expose at least one portion of the bearing surface 120*a* of the base 120. Each slot 111 is configured to accommodate one cam 133, to make each cam 133 abut against the bearing surface 120*a* inside the corresponding slot 111. Accordingly, in the process of the rotating component 130 rotating with respect to the main body 110, based on the geometric profile variation of the cam 133, the cam 133 may push the base 120, and the base 120 may slide relative to the main body 110.

The two slots 111 are respectively located at two opposite sides of the position limiting member 140 so as to make the two cams 133 of the rotating component 130 apply force to the base 120 evenly. For example, each slot 111 and the inner space of the main body 110 are mutually communicated, and each slot 111 further penetrates the top surface 110*a* and connects two opposite sidewall surfaces of the top surface 110*a*, but the disclosure is not limited thereto. On the other hand, the number of the cams 133 is the same as the number of the slots 111, and the number of the cams 133 and the number of the slots 111 are adjusted according to actual requirements.

Referring to FIGS. 1 and 2 again, in the present embodiment, the cam 133 is pivoted to the main body 110 via a shaft 125. In other words, the cam 133 is configured with a hole used for mounting the shaft 125, and the hole of the cam 133 is located inside the corresponding slot 111. On the other hand, correspondingly, the main body 110 is configured with a through-hole 110*d*. The through-hole 110*d* is communicated with the slot 111, and the through-hole 110*d* is aligned with the hole of the corresponding cam 133, so as to mount the corresponding shaft 125. Furthermore, the shaft 125 defines a reference axis AX that the rotating component 130 rotates about when rotating relative to the main body 110, and the reference axis AX is misaligned with the position limiting member 140. In other words, the extending direction of the reference axis AX does not pass through the position limiting member 140, but the disclosure is not limited thereto.

To be more specific, the rotating component 130 further includes a gripping part 131 and at least one arm part 132 (schematically depicted as two). The gripping part 131 is connected to the cam 133 through the arm part 132, and the gripping part 131 facilitates an operator to apply force to the rotating component 130. It should be noted here, the number of the arm parts 132 can be adjusted according to the number of the cams 133.

On the other hand, each cam 133 has a cam surface 133*s* abutting against the bearing surface 120*a* of the base 120, and the cam surface 133*s* surrounds the shaft 125 (or the reference axis AX). When the rotating component 130 rotates about the reference axis AX with respect to the main body 110, the cam 133 moves synchronously and the cam surface 133*s* abuts against the bearing surface 120*a* of the base 120 via different portions thereon. Because of the variation in distance between the portions on the cam surface 133*s* and the reference axis AX, the base 120 can be driven by the cam 133 to slide relative to the main body 110. For example, in the process of rotating the cam 133, if the distances between the reference axis AX and the portions of the cam surface 133*s* used to abut against the bearing surface

120*a* of the base 120 are gradually increased, the proportion of the base 120 exposed from the main body 110 may be gradually increased. On the contrary, if the distances between the reference axis AX and the portions of the cam surface 133*s* used to abut against the bearing surface 120*a* of the base 120 are gradually decreased, the proportion of the base 120 exposed from the main body 110 may be gradually decreased. Therefore, the geometric profile of the cam surface 133*s* of each cam 133 can be adjusted according to the requirement of sliding path of the base 120.

It should be noted here, the shortest connecting line between the shaft 125 and the portion of the cam surface 133*s* of the cam 133 used to abut against the bearing surface 120*a* of the base 120 is substantially perpendicular to the bearing surface 120*a* and is substantially parallel to the direction (such as direction z) that the base 120 slides relative to the main body 110. Accordingly, the force applied to the base 120 by the two cams 133 can be more concentrated, so as to assist stabilizing the abutting relationship between the two cams 133 and the base 120.

Referring to FIG. 1, FIG. 2, and FIG. 3, in order to ensure the state of the rotating component 130 is locked after rotating, the lock mechanism 100 further includes a position limiting element 150 disposed on the bearing surface 120*a* of the base 120, and at least one portion of the position limiting element 150 is exposed by the slot 111. On the other hand, the cam surface 133*s* of each cam 133 is configured with a plurality of position limiting portions 1331, once the position limiting element 150 is engaged with one of the position limiting portions 1331, the rotating component 130 is locked and temporarily unable to rotate relative to the main body 110. After the force is applied to the rotating component 130 for releasing the engagement between the position limiting element 150 and the position limiting portion 1331, the rotating component 130 can be rotated relative to the main body 110 again. In other words, after rotating a specific stroke, the rotating component 130 can be locked to the base 120 through the engagement of the position limiting element 150 and the position limiting portions 1331, so as to prevent the rotating component 130 from rotating relative to the main body 110 arbitrarily. For example, the position limiting component 150 may be a convex structure protruding from the bearing surface 120*a* of the base 120, and the position limiting portion 1331 may be a concave structure that is recessed inward on the cam surface 133*s* and fits with the convex structure. In another example, the position limiting component 150 may be a concave structure that is recessed inward on the bearing surface 120*a* of the base 120, and the position limiting portion 1331 may be a convex structure protruding from the cam surface 133*s* and fitting with the concave structure.

Figure 3A:
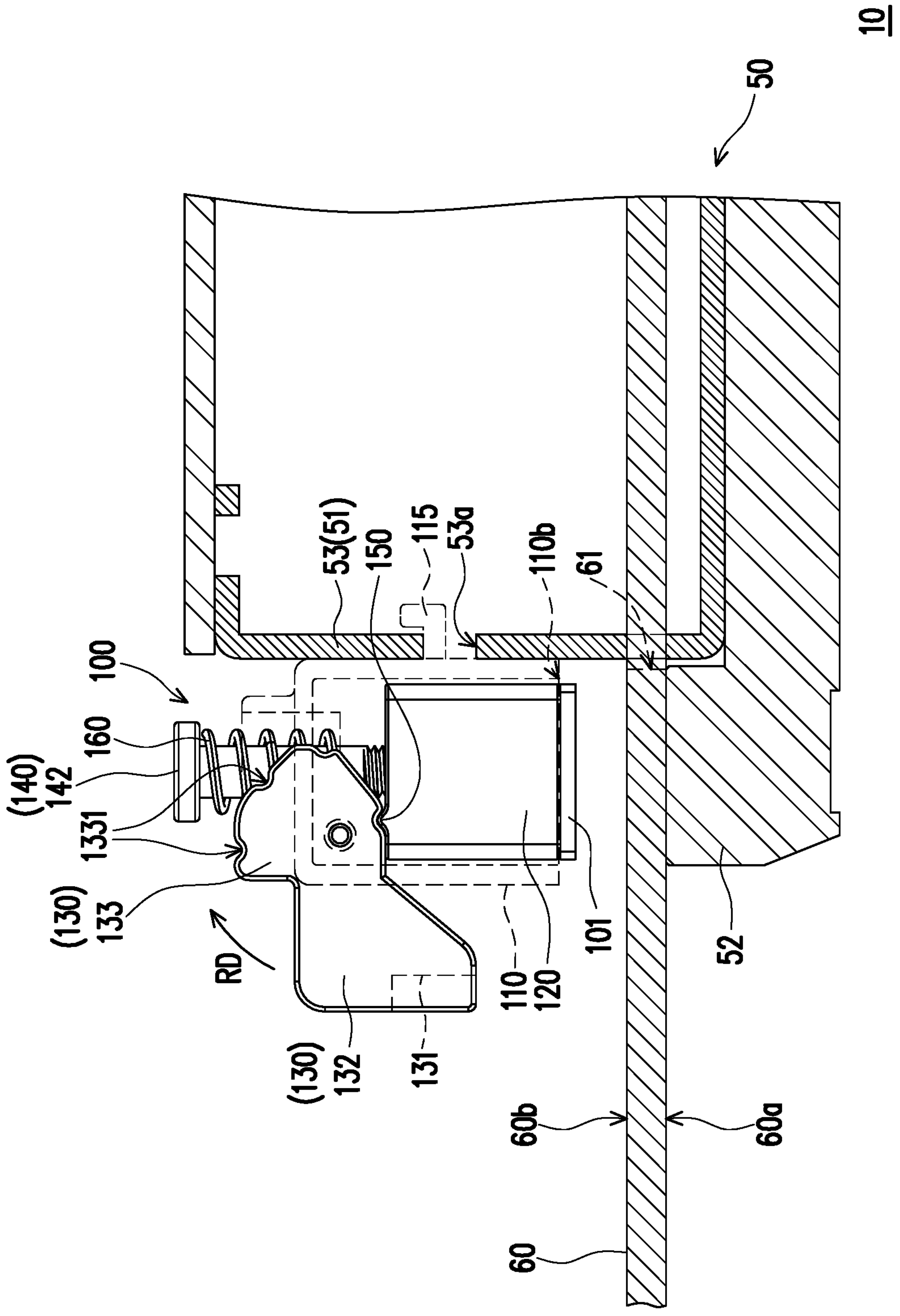
FIG. 3A and FIG. 3B are schematic views illustrating a mounting process of locking an electronic device with a carrier by the lock mechanism in one embodiment of the disclosure.
Figure 4:
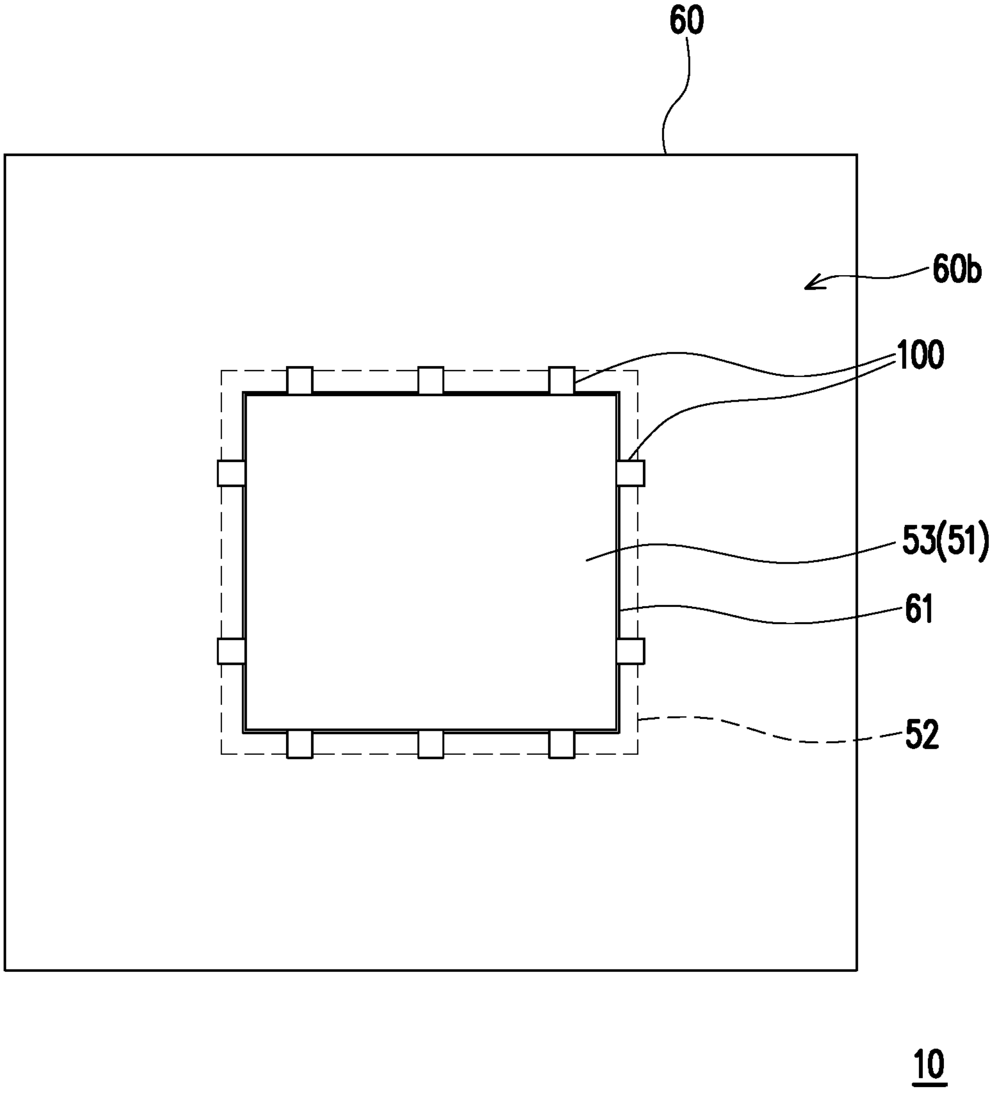
FIG. 4 is a schematic top view of a holding structure of an electronic device according to one embodiment of the disclosure.

The mounting process of the electronic device 50 being locked to a carrier 60 by the lock mechanism 100 is described hereinafter. Referring to FIG. 3A, the carrier 60 may be a portion of a machine, a portion of a wall, a frame or other carrier. The carrier 60 has the first surface 60*a*, the second surface 60*b* opposite to the first surface 60*a*, and an opening 61 penetrates the first surface 60*a* and the second surface 60*b*. Furthermore, the opening 61 can be used to accommodate the electronic device 50. The electronic device 50 includes a body 51 and a case 52 connecting to the body 51, and the case 52 surrounds the periphery of the body 51 (as shown in FIG. 4). On the other hand, the size of the body 51 is smaller than the size of the opening 61, and the size of the case 52 is greater than the size of the opening 61.

Firstly, the body 51 of the electronic device 50 is passed through the opening 61 of the carrier 60 from the first surface 60*a* of the carrier 60. Since the size of the case 52 is greater than the size of the opening 61, the case 52 would structurally interferes with the first surface 60*a* of the carrier 60 so as to stop the body 51 from moving. At this time, a mounting part 53 of the body 51 exceeds beyond the second surface 60*b* of the carrier 60. After the case 52 abuts against the first surface 60*a* of the carrier 60, the lock mechanism 100 is disposed at the periphery of the mounting part 53 of the body 51. The mounting part 53 is configured with a mounting hole 53*a* that is provided for a locking portion 115 of the main body 110 inserting into and thus is engaged with the locking portion 115. In contrast, after the engaging relationship of the locking portion 115 of the main body 110 and the mounting hole 53*a* of the mounting part 53 is released, the lock mechanism 100 can be detached from the body 51.

Figure 3B:
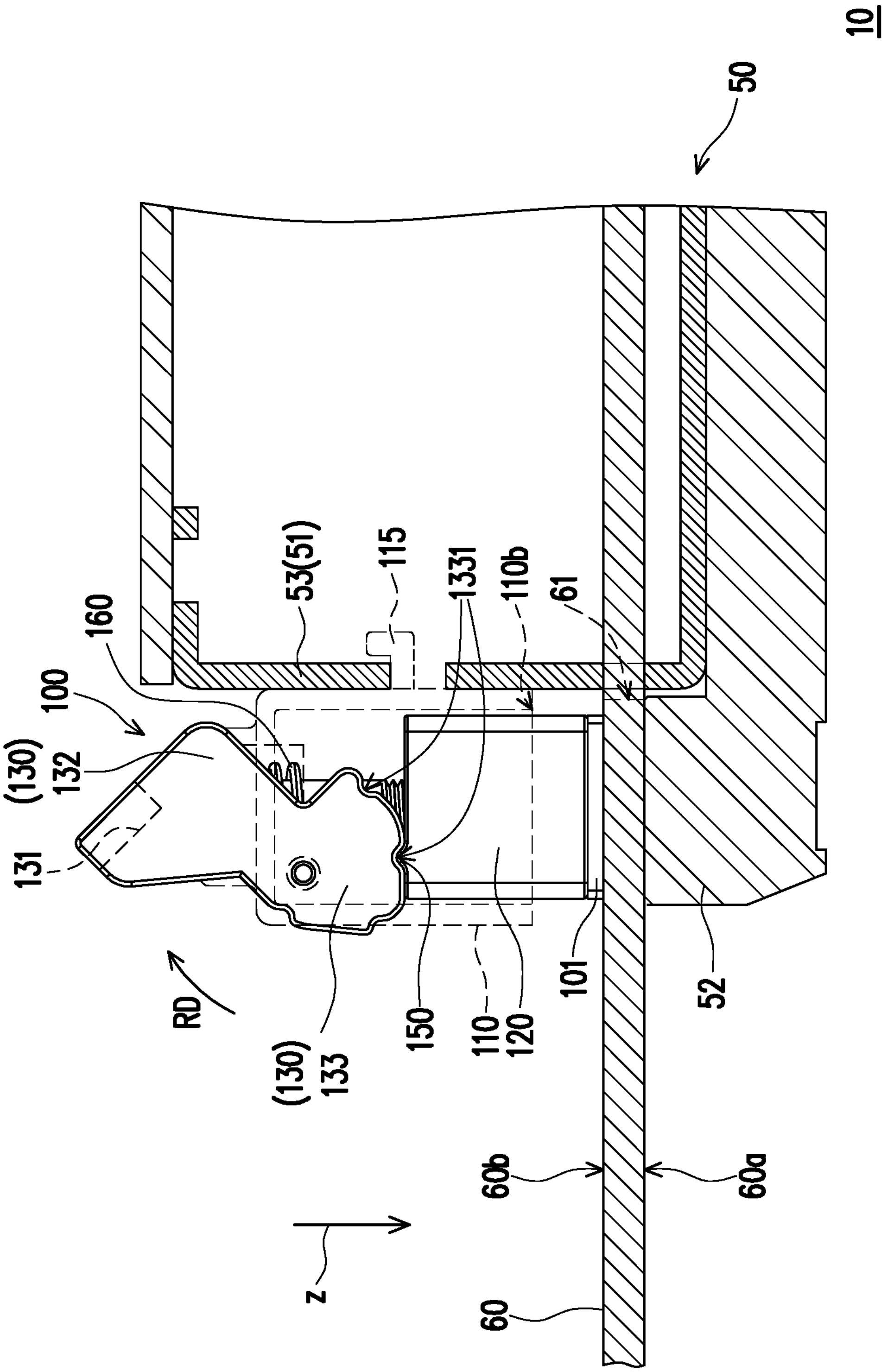

Next, referring to FIGS. 3A and 3B, the lock mechanism 100 and the case 52 are respectively located at two opposite sides of the carrier 60, and the opening 110*b* of the main body 110 faces the second surface 60*b* of the carrier 60. After the lock mechanism 100 is locked to the mounting part 53 of the body 51, the main body 110 remains stationary, and the rotating component 130 is rotated in a rotating direction RD and with respect to the main body 110. The base 120 may be pushed by the cam 133 and thus is moved in the direction toward the second surface 60*b* of the carrier 60. After the base 120 abuts against the second surface 60*b* of the carrier 60, the position limiting element 150 is engaged with one of the position limiting portions 1331, as shown in FIG. 3B. At this time, the base 120 presses against a cushioning pad 101 which is deformable, so the cushioning pad 101 is deformed and abuts against the second surface 60*b* of the carrier 60. Accordingly, the electronic device 50 can be securely mounted to the carrier plate 60. On the other hand, the operator only needs to rotate the rotating component 130 relative to the main body 110 in the reverse direction of the rotating direction RD (shown in FIG. 3B), the step of detaching the electronic device 50 from the carrier 60 may be gradually completed.

Figure 3C:
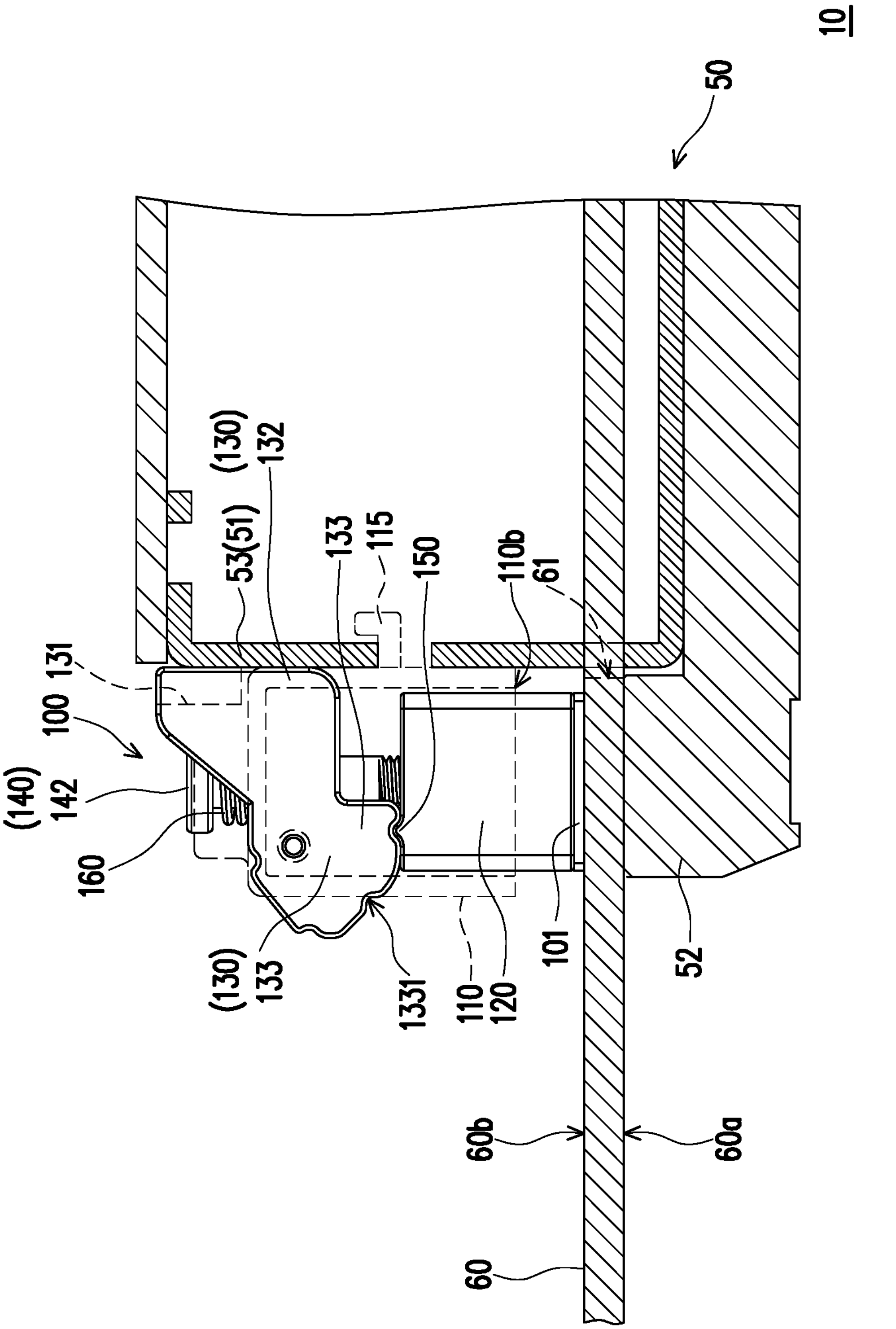
FIG. 3C is a schematic view of locking the electronic device with the carrier by the lock mechanism in FIG. 3B at another implementation state.

It should be noted here, the cam surface 133*s* of the cam 133 may be configured with a plurality of position limiting portions 1331. Accordingly, the lock mechanism 100 may lock the electronic device 50 to the carriers having different thicknesses base on the multi-stage locking design, so as to provide a better operating flexibility. In another embodiment, after the base 120 abuts against the second surface 60*b* of the carrier 60 and the position limiting element 150 is engaged with one of the position limiting portions 1331 (as shown in FIG. 3B), the operator can continuously rotate the rotating component 130 relative to the main body 110 in the rotating direction RD, so the base 120 continues to move closer to the second surface 60*b* of the carrier 60 and further compresses the cushioning pad 101 until the position limiting element 150 is engaged with the next position limiting portion 1331 and the gripping part 131 of the rotating component 130 abuts against the mounting part 53 of the body 51, as shown in FIG. 3C The base 120 further makes the cushioning pad 101 presses against the second surface 60*b* of the carrier 60, so the looking portion 115 of the main body 110 may drive the mounting part 53 of the body 51 to further move in the direction away from the second surface 60*b* of the carrier 60, and thus the case 52 presses even harder to the first surface 60*a* of the carrier 60. Accordingly, the electronic device 50 can be more securely mounted to the carrier 60, so as to have better reliability.

Referring to FIG. 3B, FIG. 3C, and FIG. 4, the electronic device 50 is locked to the carrier 60 by a plurality of lock mechanisms 100. The lock mechanisms 100 are disposed at the periphery of the mounting part 53 of the body 51, and an orthogonal projection of the base 120 of each lock mechanisms 100 on the carrier 60 and an orthogonal projection of the case 52 of the electronic device 50 on the carrier 60 are overlapped with each other. In other words, in the direction perpendicular to the first surface 60*a* or the second surface 60*b* of the carrier 60, the base 120 of each lock mechanisms 100 is overlapped with the electronic device 50. Therefore, the force applied to the carrier 60 by the base 120 of each lock mechanisms 100 is aligned with the force applied to the carrier 60 by the case 52 of the electronic device 50, so as to increase the stability of the electronic device 50 mounted on the carrier 60.

Furthermore, as shown in FIG. 1, FIG. 2, and FIG. 3A to FIG. 3C, the lock mechanism 100 further includes an elastic member 160, and the elastic member 160 is a compressed spring as an example. The elastic member 160 is sleeved on the position limiting member 140, and two opposite ends of the elastic member 160 respectively abut against the main body 110 and the second end 142 of the position limiting member 140. Furthermore, the through-hole 110*c* of the main body 110 is configured with a position limiting structure therein, and one end of the elastic member 160 may be inserted into the through-hole 110*c* and abut against the position limiting structure inside the through-hole 110*c*. In the process of the position limiting member 140 being slid along with the base 120 with respect to the main body 110, if the base 120 slides in the direction away from the top surface 110*a*, the elastic member 160 is compressed by the second end 142 of the position limiting member 140. At this time, the compressed elastic member 160 can apply a reaction force on the second end 142 of the position limiting member 140, so as to indirectly make the base 120 receive a force. Consequently, the bearing surface 120*a* of the base 120 is tightly attached to the cam surface 133*s* of the cam 133. Therefore, the engagement of the position limiting element 150 and one of the position limiting portions 1331 is more stable based on the design of the elastic member 160.

On the other hand, the first end 141 of the position limiting member 140 is fastened to the base 120, and the depth that the first end 141 of the position limiting member 140 fastened into the locking hole 120*b* can be adjusted. The greater the depth that the first end 141 of the position limiting member 140 fastened into the locking hole 120*b* is, the greater the amount of compression that the elastic member 160 compressed by the second end 142 of the position limiting member 140 becomes. The greater the amount of compression that the elastic member 160 compressed by the second end 142 of the position limiting member 140 in advance is, the greater the force that the operator needs to apply to rotate the rotating component 130 becomes. Correspondingly, the engagement of the position limiting element 150 and one of the position limiting portions 1331 is based on a greater amount of pre-compression of the elastic member 160 and thus is more stable.

In the following, other embodiments will be described in detail to explain the disclosure in detail, and the same components will be denoted by the same reference numerals, and the description of the same technical content will be omitted. For the omitted part, please refer to the foregoing embodiments, and details are not described below.

Figure 5:
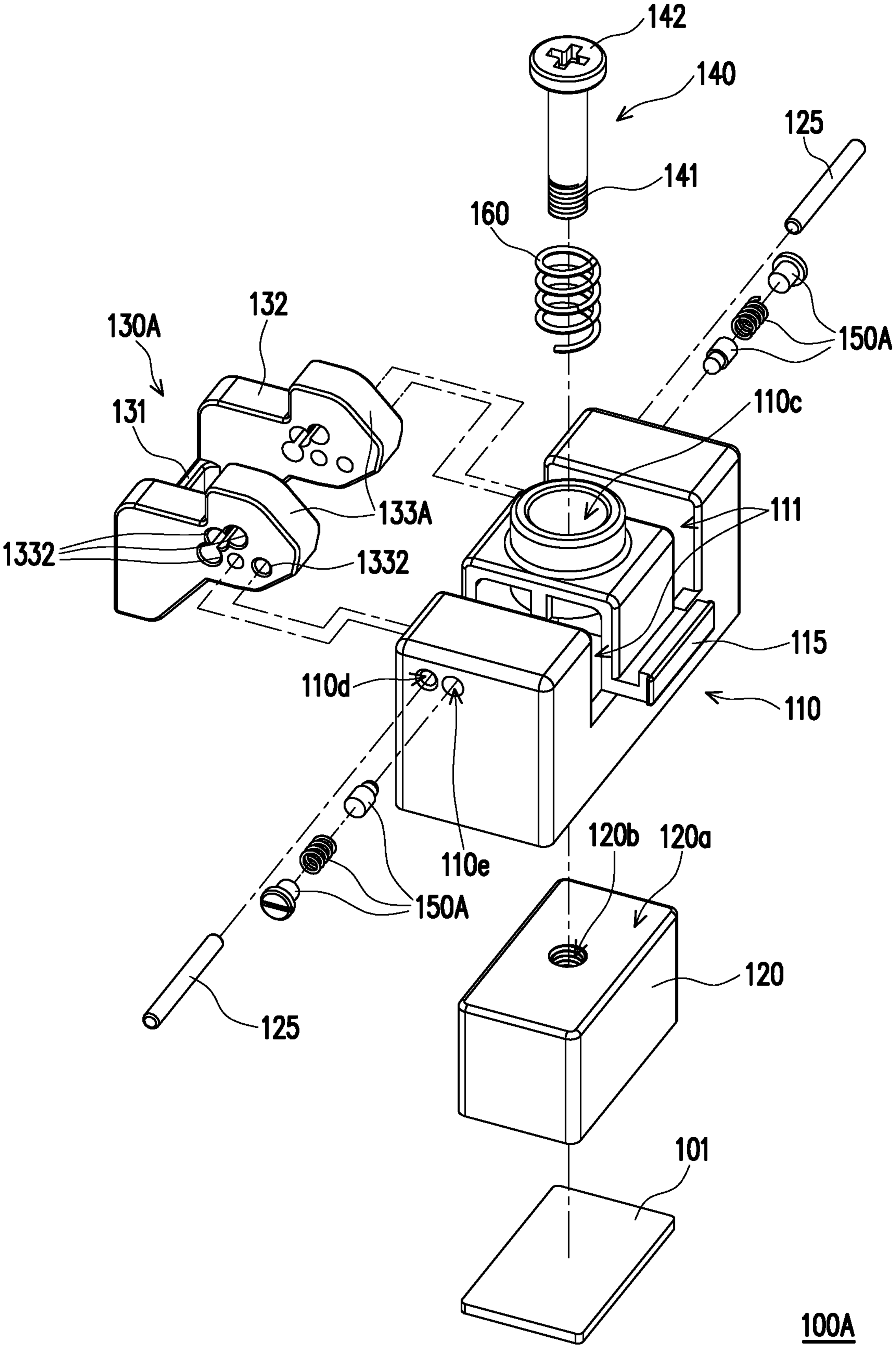
FIG. 5 is an exploded view of a lock mechanism according to another embodiment of the disclosure.
Figure 6:
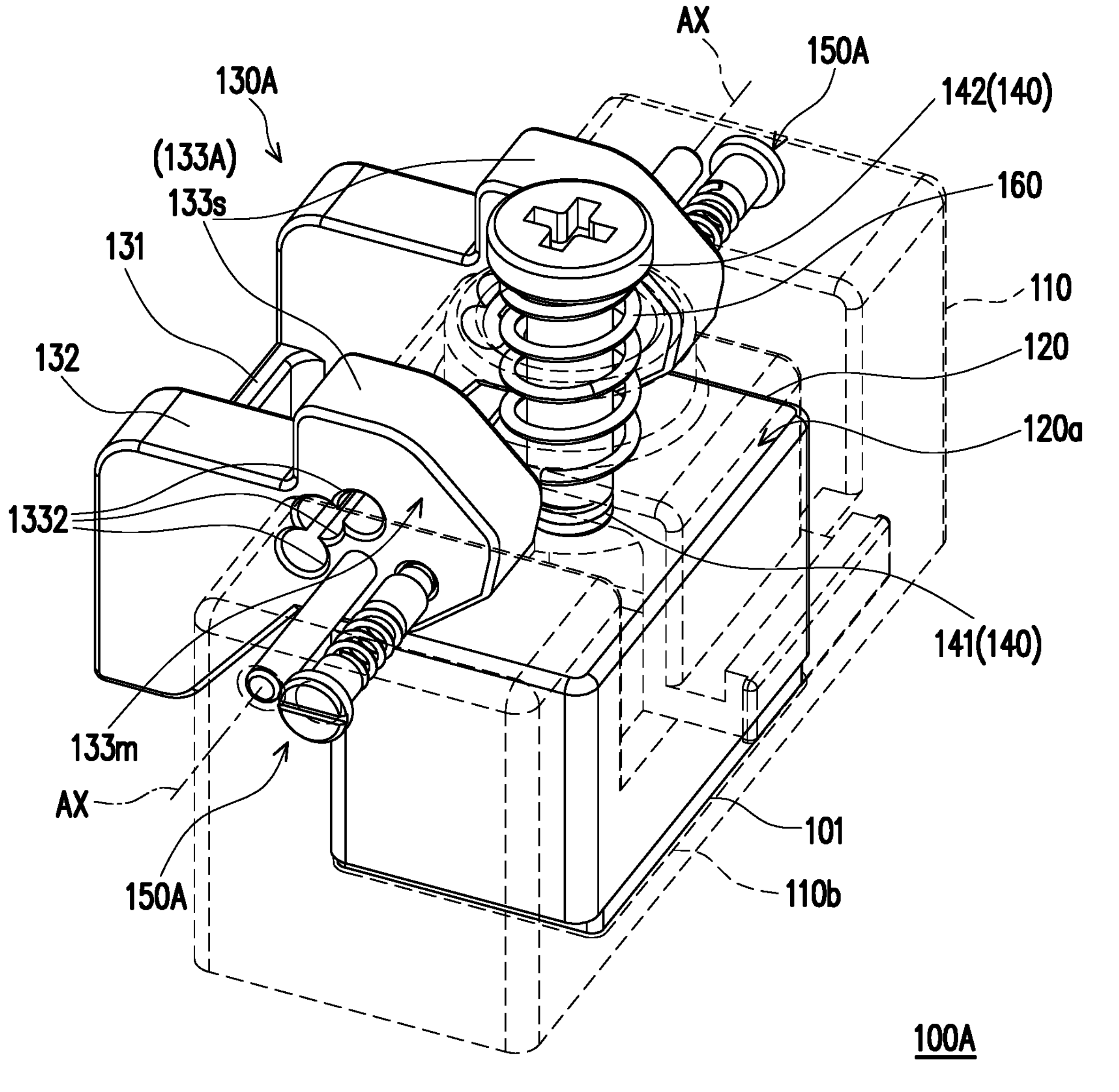
FIG. 6 is a schematic view of the lock mechanism according to another embodiment of the disclosure.

FIG. 5 is an exploded view of a lock mechanism according to another embodiment of the disclosure. FIG. 6 is a schematic view of the lock mechanism according to another embodiment of the disclosure. It should be noted here, in order to clearly show the internal configuration of the main body 110, the main body 110 in FIG. 6 is represented by dotted line.

Referring to FIG. 5 and FIG. 6, a lock mechanism 100A in the present embodiment and the lock mechanism 100 in the previous embodiment are substantially similar in design principle, the main differences are the configuration of the position limiting element 150A and the structural design of the cam 133A. In the present embodiment, the position limiting element 150A is disposed on the main body 110. The number of the position limiting elements 150A are two, and each slot 111 is configured with one position limiting element 150A correspondingly. Furthermore, at least a portion of each position limiting element 150A extends into the corresponding slot 111 and is fitted with the cam 133A disposed inside the corresponding slot 111. For example, the main body 110 is configured with two through-holes 110*e*. The two through-holes 110*e* are respectively communicated with two slots 111, and the two through-holes 110*e* are used to accommodate the two position limiting elements 150A. Each of the position limiting elements 150A passes through the corresponding through-hole 110*e* and extends into the slot 111. The two position limiting elements 150A may be pogo pins, but the disclosure is not limited thereto.

On the other hand, the cam 133A has a plurality of position limiting portions 1332. The position limiting portions 1332 are located on a side surface 133*m* connecting with the cam surface 133*s* (as shown in FIG. 6) and are surrounded by the cam surface 133*s*. For example, the position limiting portions 1332 of the cam 133A may be a plurality of locking holes surrounding the shaft 125 that is configured to pivotally connect the cam 133A to the main body 110. The shortest distances from the position limiting portions 1332 of the cam 133A to the corresponding shaft 125 are substantially the same to ensure that the corresponding position limiting element 150A is able to engage with any one of the position limiting portions 1332. In other words, the cam 133A is rotated about the reference axis AX to define the rotating path of the position limiting portions 1332, and the position limiting element 150A is located on the rotating path.

Take a step further, in the process that each cam 133A is rotated about the reference axis AX and relative to the main body 110, once any one of the position limiting portions 1332 is aligned with the position limiting element 150A on the main body 110, the position limiting element 150A may be locked into that position limiting portion 1332. Therefore, the rotating component 130A is locked and is unable to rotate relative to the main body 110, temporarily. After a force is applied to the rotating component 130A to release the engagement between the position limiting element 150A and the position limiting portion 1332, the rotating component 130A can be rotated relative to the main body 110 again. In other words, after rotating a specific stroke, the rotating component 130A can be locked to the main body 110 through the fitting of the position limiting element 150A and the position limiting portions 1332 of the corresponding cam 133A.

Figure 7:
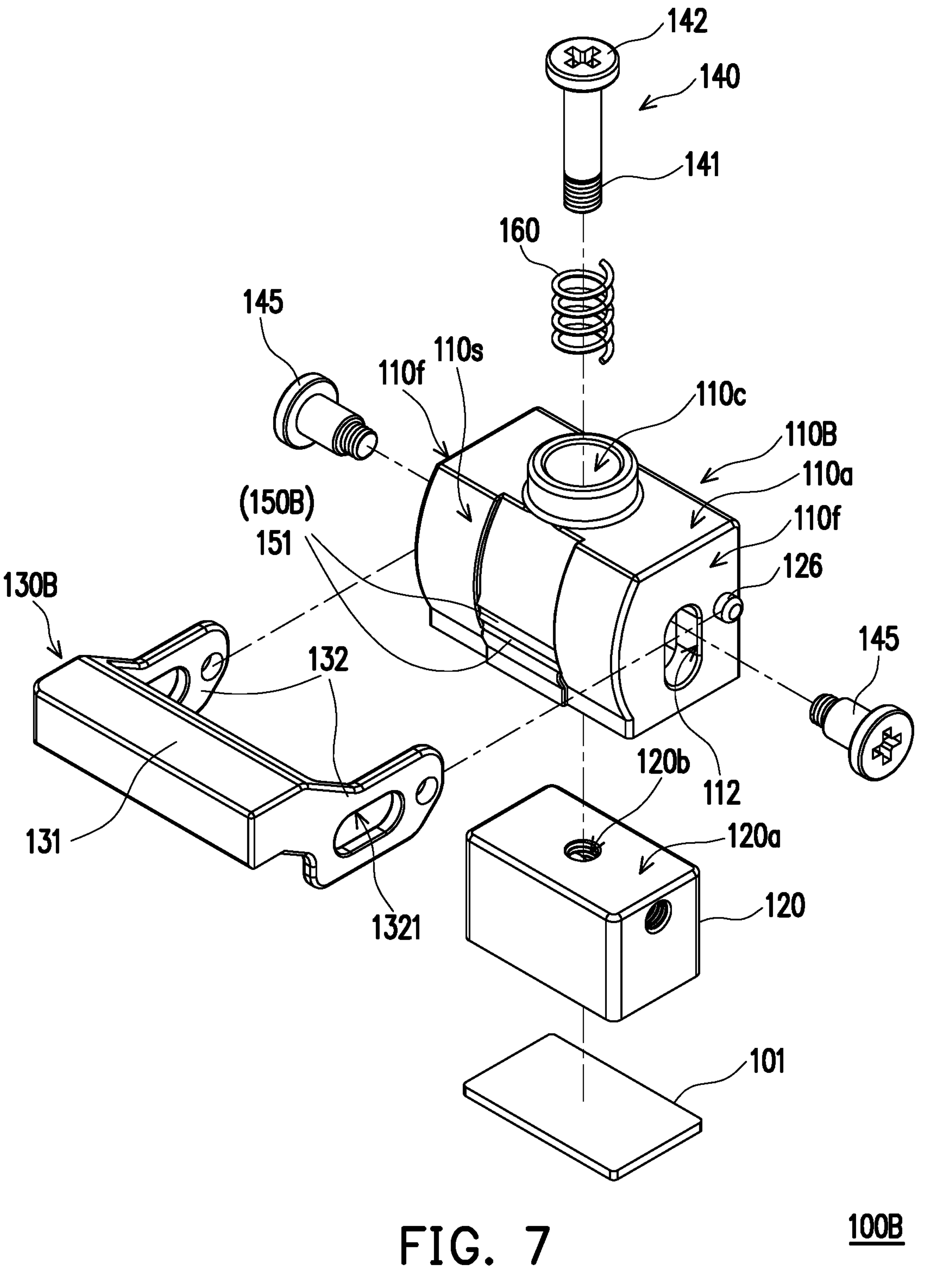
FIG. 7 is an exploded view of a lock mechanism according to yet another embodiment of the disclosure.
Figure 8:
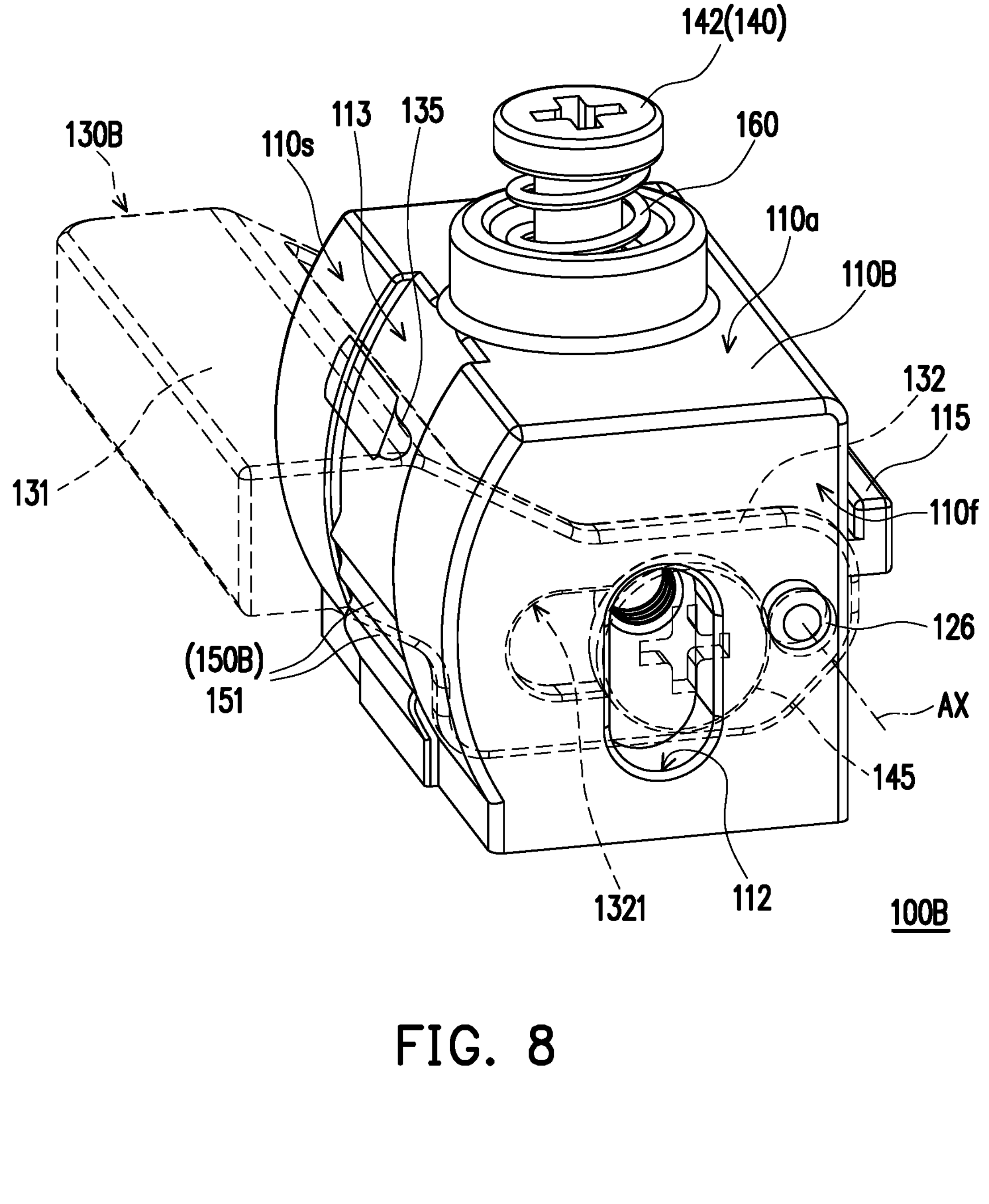
FIG. 8 is a schematic view of the lock mechanism according to yet another embodiment of the disclosure.

FIG. 7 is an exploded view of a lock mechanism according to yet another embodiment of the disclosure. FIG. 8 is a schematic view of the lock mechanism according to yet another embodiment of the disclosure. It should be noted here, in order to clearly show the engagement of the main body 110 and the rotating component 130B, the rotating component 130B in FIG. 8 is represented by dotted line.

Referring to FIG. 7 and FIG. 8, a lock mechanism 100B in the present embodiment and the lock mechanism 100 in the previous embodiment are substantially similar in design principle, the main differences are the method of the rotating component 130B driving the base 120, the structural design of the main body 110B, the structural design of the rotating component 130B, and the configuration of the position limiting element 150B. In the present embodiment, the main body 110B has two side walls 110*f* connecting to the top surface 110*a*. The lock mechanism 100B further includes at least one guiding member 145 (schematically depicted as two), and the two guiding members 145 respectively pass through the two side walls 110*f* of the main body 110B to be fastened to the two opposite sides of the base 120. Take a step further, the two guiding members 145 have one degree of freedom for sliding relative to the main body 110B, and the base 120 is able to slide along with the two guiding members 145 and relative to the main body 110B.

The rotating component 130B includes at least one arm part 132 (schematically depicted as two), and the two arm parts 132 are respectively pivoted to the two side walls 110*f*. To be more specific, the two guiding members 145 respectively pass through the two arm parts 132, and each of the two guiding members 145 has one degree of freedom for sliding relative to the corresponding arm part 132. Therefore, in the process of the rotating component 130B being rotated relative to the main body 110B, each of the guiding members 145 is driven by the corresponding arm part 132 to slide relative to the main body 110B, so as to drive the base 120 to slide relative to the main body 110B. For example, each arm part 132 has a first position limiting slot 1321, and each side wall 110*f* is configured with a second position limiting slot 112. The first position limiting slot 1321 of each arm part 132 is partially overlapped with the second position limiting slot 112 of the corresponding side wall 110*f*, and the second position limiting slot 112 of each side wall 110*f* exposes at least one portion of the base 120. Therefore, each guiding member 145 can sequentially pass through the corresponding first position limiting slot 1321 and the corresponding second position limiting slot 112, such that the first guiding member 145 may be fastened into the base 120.

On the other hand, the main body 110B is configured with a shaft 126 at each side wall 110*f* (i.e., the side that the second limiting slot 112 is located). Each shaft 126 and the corresponding second position limiting slot 112 are arranged side by side, and the arm part 132 is pivoted to the main body 110B through the shaft 126. To be more specific, the rotating component 130B can be rotated relative to the main body 110B and about the reference axis AX of the two shafts 126, so as to drive each guiding member 145 to slide within the corresponding first position limiting slot 1321 and the corresponding second position limiting slot 112, and thus to drive the base 120 to slide relative to the main body 110B. In the present embodiment, the sliding direction of each guiding member 145 within the corresponding second position limiting slot 112 is perpendicular to the reference axis AX. In addition, along with the rotation of the rotating component 130B relative to the main body 110B, the position of the guiding member 145 within the corresponding first position limiting slot 1321 is also changed. In other words, the rotation of the rotating component 130B relative to the main body 110B can drive the guiding member 145 to slide within the corresponding second position limiting slot 112. On the other hand, the sliding direction of each guiding member 145 within the corresponding first position limiting slot 1321 may be the extending direction of that first position limiting slot 1321. Accordingly, the sliding direction of each guiding member 145 within the corresponding second position limiting slot 112 may be the extending direction of that second position limiting slot 112. The extending directions of the first position limiting slot 1321 and the second position limiting slot 112, which are corresponding to each other, are always kept to be intersected with each other, so as to ensure that each guiding member 145 is driven by the rotating component 130B.

In the present embodiment, the main body 110B further has a bearing surface 110*s*. The bearing surface 110*s* is located between the two side walls 110*f* and is connected to the top surface 110*a* and the two side walls 110*f*. To be more specific, the position limiting element 150B is disposed on the bearing surface 110*s* and includes a plurality of position limiting portions 151. On the other hand, the gripping part 131 of the rotating component 130B has an engaging portion 135 on a side facing the bearing surface 110*s*, and the engaging portion 135 is used to engage with the position limiting portions 151. Furthermore, the position limiting portions 151 are located on the moving path of the engaging portion 135. In the process that the rotating component 130B is rotated relative to the main body 110B, the engaging portion 135 can be moved toward the position limiting portions 151 and thus is engaged with one of the position limiting portions 151. Once the engaging portion 135 is engaged with one of the position limiting portions 151, the rotating component 130B is locked and temporarily unable to rotate relative to the main body 110B. After the force is applied to the rotating component 130B to release the engagement between the engaging portion 135 and the position limiting component 150, the rotating component 130B can be rotated relative to the main body 110B again. In other words, after rotating a specific stroke, the rotating component 130B can be locked to the main body 110B through the engagement of the engaging portion 135 and the position limiting component 150B.

For example, the position limiting component 150B may be a crest and sag structure located on the bearing surface 110*s*, and the engaging portion 135 may be a convex structure or a concave structure that fits with the crest and sag structure. On the other hand, the main body 110B further has a recess 113 located on the bearing surface 110*s*. The recess 113 extends from the top surface 110*a* to the bottom surface opposite to the top surface 110*a*, and the position limiting component 150B is disposed in the recess 113 and at a side away from the top surface 110*a* (such as the side close to the bottom surface) for example. Since the engaging portion 135 extends into the recess 113, the engaging portion 135 may be guided by the recess 113 while moving on the bearing surface 110*s*, so as to ensure that the engaging portion 135 to move through the position limiting component 150B.

In summary, the lock mechanism of one embodiment of the disclosure is extremely convenient in operation. By driving the rotating component to rotate relative to the main body, the base is able to be directly or indirectly driven by the rotating component to slide relative to the main body. Since the holding structure for the electronic device adopts the lock mechanism in one embodiment of the disclosure, the steps to mount or remove the electronic device are extremely fast and easy for the operator. On the other hand, after the electronic device is locked on the carrier by the lock mechanisms, the rotating component is prevented from being arbitrarily rotated because of the engagement of the rotating component and the position limiting component. Accordingly, the electronic device is firmly mounted on the carrier. In other words, the holding structure for the electronic device in one embodiment of the disclosure has a good reliability.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A lock mechanism, comprising:

a main body;

a base, slidably connected to the main body, and the main body being sleeved on the base;

a rotating component, pivoted to the main body, and the rotating component being configured to drive the base to slide relative to the main body;

a position limiting component, coupled to the rotating component so as to lock the rotating component with one of the main body and the base;

a position limiting member passing through the main body and being fastened with the base, the position limiting member has a first end and a second end opposite to each other, the first end is used to engage with the base, and the second end is used to interfere with the main body to ensure the sliding connection between the base and the main body; and an elastic member, wherein the position limiting member has a first end fastened to the base and a second end opposite to the first end, and two opposite ends of the elastic member respectively abut against the main body and the second end of the position limiting member.

2. The lock mechanism as recited in claim 1, wherein the rotating component comprises at least one cam abutting against the base, and the at least one cam is pivoted to the main body.

3. The lock mechanism as recited in claim 2, further comprising at least one shaft configured to pivotally connect the cam with the main body, wherein the cam has a cam surface abutting against a bearing surface of the base, and the cam surface surrounds the shaft.

4. The lock mechanism as recited in claim 3, wherein the position limiting component is disposed on the bearing surface of the base, the cam surface of the cam is configured with a plurality of position limiting portions, and the position limiting component is engaged with one of the position limiting portions.

5. The lock mechanism as recited in claim 4, wherein the position limiting component comprises a convex structure protruding from the bearing surface, and the position limiting portions comprises a plurality of concave structures fitting with the convex structure.

6. The lock mechanism as recited in claim 4, wherein the main body comprises at least one slot configured to expose a portion of the position limiting component and a portion of the bearing surface of the base, and at least a portion of the cam surface of the cam and at least one of the position limiting portions are located inside the slot.

7. The lock mechanism as recited in claim 3, wherein the position limiting component is disposed on the main body, the cam is configured with a plurality of position limiting portions surrounded by the cam surface, and the position limiting component is engaged with one of the position limiting portions.

8. The lock mechanism as recited in claim 7, wherein the position limiting component comprises a pogo pin, and the position limiting portion comprises a plurality of hooking holes fitting with the pogo pin.

9. The lock mechanism as recited in claim 7, wherein the main body comprises at least one slot configured to expose a portion of the bearing surface of the base, at least a portion of the cam surface of the cam and at least one of the position limiting portions are located inside the slot, and position limiting component extends into the slot.

10. The lock mechanism as recited in claim 1, further comprising a guiding member passing through the main body and fastening with the base, wherein the rotating component comprises at least one arm part pivoted to the main body, the arm part is located at one side of the main body, and the guiding member is slidably connected to the arm part.

11. The lock mechanism as recited in claim 10, wherein the arm part has a first position limiting slot, the main body has a second position limiting slot partially overlapped with the first position limiting slot, and the guiding member passes through the first position limiting slot and the second position limiting slot.

12. The lock mechanism as recited in claim 11, wherein the main body is configured with a shaft on a side that the second position limiting slot is located, the shaft and the second position limiting slot are arranged side by side, and the arm part is pivoted to the shaft.

13. The lock mechanism as recited in claim 11, wherein the first position limiting slot intersects with the second position limiting slot.

14. The lock mechanism as recited in claim 10, wherein the main body has a bearing surface, the position limiting component comprises a plurality of position limiting portions disposed on the bearing surface, and the rotating component further comprises an engaging portion located at one side of the arm part, wherein the engaging portion faces the bearing surface, and the engaging portion is engaged with one of the position limiting portions.

15. The lock mechanism as recited in claim 1, wherein the rotating component rotates relative to the main body about an axis, and the axis is misaligned with the position limiting member.

16. A holding structure of an electronic device, comprising:

a carrier, having a first surface, a second surface opposite to the first surface, and an opening penetrating through the first surface and the second surface;

an electronic device, comprising a body and a case connecting to the body, wherein the case abuts against the first surface of the carrier, the body penetrates through the opening of the carrier, and the body has a mounting part extending beyond the second surface of the carrier; and a plurality of lock mechanisms, disposed at a periphery of the mounting part of the body, each of the lock mechanisms comprising:

a main body, detachably fastened with the mounting part of the body;

a base, slidably connected to the main body, and the main body being sleeved on the base;

a rotating component, pivoted to the main body, wherein the rotating component drives the base to slide relative to the main body in a direction toward the second surface of the carrier and to abut against the second surface of the carrier, or drives the base to slide relative to the main body in a direction away from the second surface of the carrier to make the base and the second surface of the carrier separate from each other; and a position limiting component, coupled to the rotating component so as to lock the rotating component with one of the main body and the base.

17. The holding structure of the electronic device as recited in claim 16, wherein the rotating component comprises:

at least one cam, abutting against the base, and the at least one cam being pivoted to the main body; and at least one shaft, configured to pivotally connect the cam with the main body, wherein the cam has a cam surface pressing against a bearing surface of the base, and the cam surface surrounds the shaft, wherein the position limiting component is disposed on the bearing surface of the base, the cam surface of the cam is configured with a plurality of position limiting portions, and when the base presses against the second surface of the carrier, the position limiting component is engaged with one of the position limiting portions.

18. The holding structure of the electronic device as recited in claim 16, wherein an orthogonal projection of the base on the carrier is overlapped with an orthogonal projection of the case on the carrier.

* * * * *